(12) United States Patent
Koran

(10) Patent No.: US 10,262,339 B2
(45) Date of Patent: *Apr. 16, 2019

(54) EXTERNALITY-BASED ADVERTISEMENT BID AND BUDGET ALLOCATION ADJUSTMENT

(71) Applicant: Amobee, Inc., Redwood City, CA (US)

(72) Inventor: Joshua M. Koran, Los Altos, CA (US)

(73) Assignee: Amobee, Inc., Redwood City, CA (US)

( * ) Notice: Subject to any disclaimer, the term of this patent is extended or adjusted under 35 U.S.C. 154(b) by 939 days.

This patent is subject to a terminal disclaimer.

(21) Appl. No.: 14/803,479

(22) Filed: Jul. 20, 2015

(65) Prior Publication Data

US 2017/0024776 A1 Jan. 26, 2017

(51) Int. Cl.
*G06Q 30/02* (2012.01)

(52) U.S. Cl.
CPC ............... *G06Q 30/0275* (2013.01)

(58) Field of Classification Search
CPC ....................................... G06Q 30/02
USPC ....................................... 705/14.71
See application file for complete search history.

(56) References Cited

U.S. PATENT DOCUMENTS

| 8,041,599 | B2 | 10/2011 | Boss et al. |
| 8,050,978 | B2 | 11/2011 | Payton |
| 8,799,081 | B1 | 8/2014 | Koran |
| 2010/0228635 | A1* | 9/2010 | Ghosh .............. G06Q 30/02 705/14.71 |

OTHER PUBLICATIONS

"U.S. Appl. No. 14/139,706, Examiner Interview Summary dated May 29, 2014", 3 pgs.
"U.S. Appl. No. 14/139,706, Non Final Office Action dated Feb. 26, 2014", 15 pgs.
"U.S. Appl. No. 14/139,706, Notice of Allowance dated Jun. 13, 2014", 8 pgs.

* cited by examiner

*Primary Examiner* — Marilyn G Macasiano
(74) *Attorney, Agent, or Firm* — Kwan & Olynick LLP

(57) ABSTRACT

Within a computer networking environment, a first bid request having data is received. Bids are determined for advertisements based on the data associated with such first bid request. It may be determined that the first bid request's data includes one or more specific types of data for a bonus variable. At least a first portion of the bids that were determined for the first bid request are increased by a bonus amount in response to the one or more specific types of data for a bonus variable being determined to be present in the first bid request's data. For the first bid request, an optimum set of one or more of the bids are selected and transmitted, along with a reference to the associated advertisement, via to a sender of the first bid request.

24 Claims, 6 Drawing Sheets

EXTERNALITY-BASED ADVERTISEMENT BID AND BUDGET ALLOCATION ADJUSTMENT

CROSS REFERENCE TO RELATED APPLICATION

This application is related to U.S. patent application Ser. No. 14/139,706 filed 23 Dec. 2013, now U.S. Pat. No. 8,799,081 issued 5 Aug. 2014, by Joshua M. Koran, which application is incorporated herein by reference in its entirety for all purposes.

TECHNICAL FIELD OF THE INVENTION

The present invention relates to on-line advertising, and more specifically to managing bids for advertisement placement and the like.

BACKGROUND

In online advertising, internet users are presented with advertisements as they browse the internet using a web browser. Online advertising is an efficient way for advertisers to convey advertising information to potential purchasers of goods and services. It is also an efficient tool for non-profit/political organizations to increase the awareness in a target group of people. The presentation of an advertisement to a single internet user is referred to as an ad impression.

Billions of display ad impressions are purchased on a daily basis through public auctions hosted by real time bidding (RTB) exchanges. In many instances, a decision by an advertiser regarding whether to submit a bid for a selected RTB ad request is made in milliseconds. Advertisers often try to buy a set of ad impressions to reach as many targeted users as possible given one or more budget restrictions. Advertisers may seek an advertiser-specific action from advertisement viewers. For instance, an advertiser may seek to have an advertisement viewer purchase a product, fill out a form, sign up for e-mails, and/or perform some other type of action. An action desired by the advertiser may also be referred to as a conversion.

Each impression is often sold by a publisher of media content that is to be viewed by a particular user. Along with the bid request, different publishers often provide different amounts and types of information regarding the users, media content, and ad placement space.

SUMMARY OF THE INVENTION

The following presents a simplified summary of the disclosure in order to provide a basic understanding of certain embodiments of the invention. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

In general, certain embodiments of the present invention provide mechanisms for bidding on placement of advertisements within media content that is deliverable within a computer networking environment. In an example implementation, a first bid request having data is received. Bids are determined for advertisements based on the data associated with such first bid request. It may be determined that the first bid request's data includes one or more specific types of data for a bonus variable. At least a first portion of the bids that were determined for the first bid request are increased by a bonus amount in response to the one or more specific types of data for a bonus variable being determined to be present in the first bid request's data. For the first bid request, an optimum set of one or more of the bids are also selected and transmitted, along with a reference to the associated advertisement, via to a sender of the first bid request. In one aspect, one or more specific types of data that is included is user demographic specifications.

In a specific implementation, the method includes (i) receiving a second bid request having data, (ii) determining a plurality of second bids for a plurality of advertisements via a computer processor of the bid determination platform based on the data associated with such second bid request, (iii) determining that the second bid request's data is missing the one or more specific types of data for a bonus variable, (iv) maintaining at least a first portion of the second bids that were determined for the second bid request, and (v) for the second bid request, selecting a second optimum set of one or more of the second bids and transmitting the second optimum bid, along with a reference to the associated advertisement, via the communication interface to a sender of the second bid request.

In another embodiment, increasing a first portion of the bids includes increasing each bid of the first portion by a predefined bonus amount that is predefined with respect to one or more bonus variables that are included in the bid request associated with the bid. In yet another embodiment, increasing the first portion of the bids includes increasing different ones of the first portion bids by different bonus amounts for different advertisers or advertisements. In a further aspect, increasing the first portion of the bids includes increasing different ones of the first portion bids by different bonus amounts for different publishers who send a corresponding plurality of bid requests for which the first portions bids are determined.

In another implementation, statistical data for variances between bids that are determined for bid requests having varying amounts of variable data is collected, and the first portion of bids are increased by a bonus amount that dynamically varies based on the collected statistical data. In another aspect, each bid is further based on an allocation amount for a particular campaign to receive of a predefined budget for a plurality of associated campaigns, and such allocation amount is based on performance levels of the particular campaign relative to its associated campaigns. Such allocation amount is also adjusted by either a bonus amount in response to the one or more specific types of data being determined to be present in the first bid request's data or a penalty amount in response to one or more types of data being missing from the first bid request's data.

In another embodiment, the method includes (i) at a communication interface of a bid determination platform, receiving a second bid request having data, (ii) determining a plurality of second bids for a plurality of advertisements via a computer processor of the bid determination platform based on the data associated with such second bid request, (iii) determining that the second bid request's data is missing one or more second specific types of data for a bonus variable, (iv) decreasing via the computer processor at least a first portion of the second bids that were determined for the second bid request, wherein an amount of each of the first portion of the second bids for the second bid request is decreased by a penalty amount in response to the one or more second specific types of data being determined to be missing from the second bid request's data, and (v) for the second bid request, selecting a second optimum set of one or more of the second bids and transmitting the second optimum bid, along with a reference to the associated advertisement, via the communication interface to a sender of the second bid request.

In another embodiment, the method includes determining that the first bid request's data is missing one or more second specific types of data for a penalty variable and decreasing via the computer processor at least a second portion, which may also include at least a portion of the first portion, of the bids that were determined for the first bid request. An amount of each of the second portion of the bids for the first bid request is decreased by a penalty amount in response to the one or more second specific types of data being determined to be missing from the first bid request's data.

In another embodiment, the invention pertains to an apparatus having at least a processor and a memory. The processor and/or memory are configured to perform one or more of the above described operations. In another embodiment, the invention pertains to at least one computer readable storage medium having computer program instructions stored thereon that are arranged to perform one or more of the above described operations.

These and other features of the present invention will be presented in more detail in the following specification of certain embodiments of the invention and the accompanying figures which illustrate by way of example the principles of the invention.

DETAILED DESCRIPTION OF THE SPECIFIC EMBODIMENTS

Figure 1A:
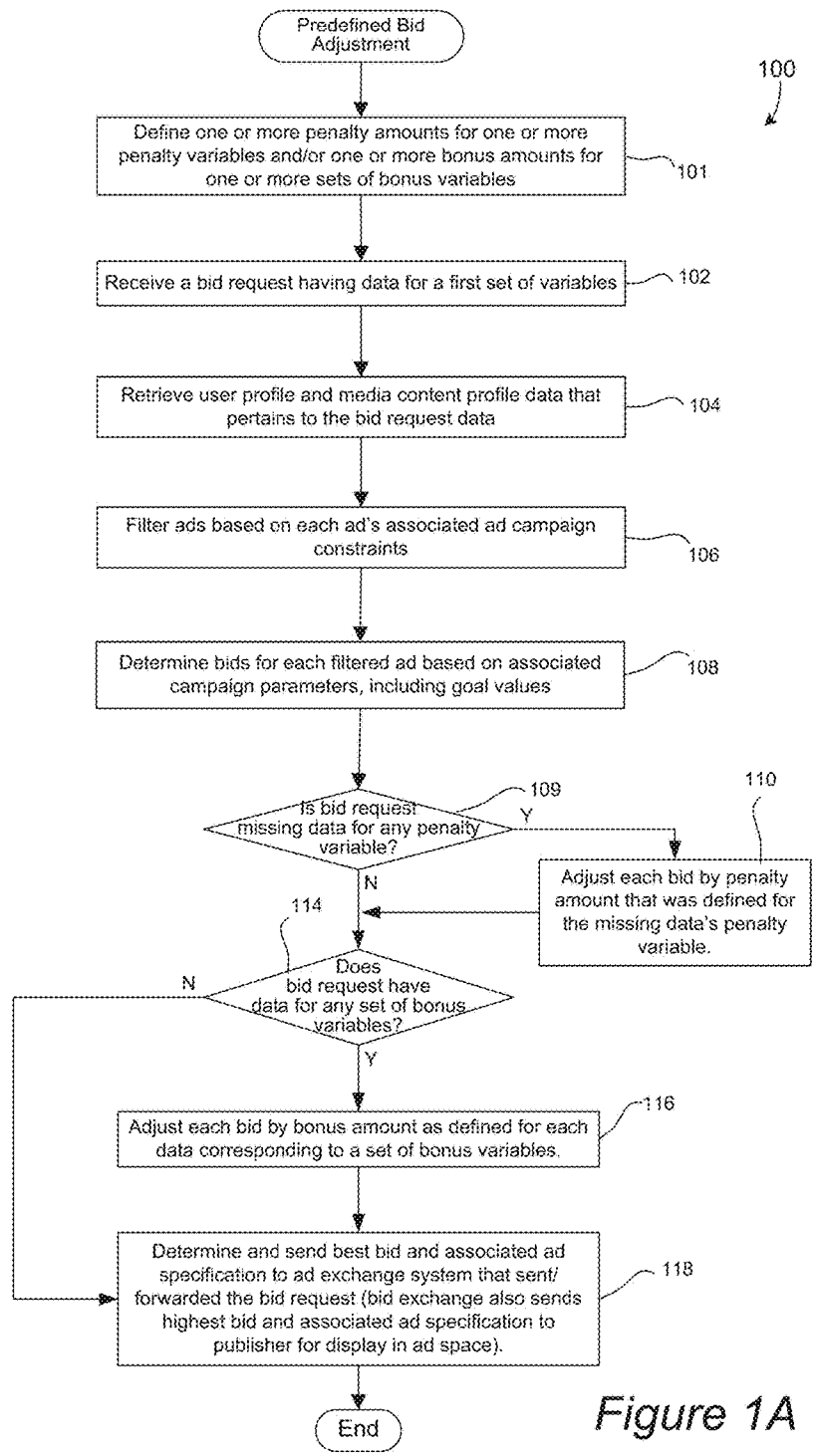
FIG. 1A is a flow chart of a process for adjusting a bid based on predefined penalty or bonus amounts in accordance with one embodiment of the present invention.

In the following description, numerous specific details are set forth in order to provide a thorough understanding of the present invention. The present invention may be practiced without some or all of these specific details. In other instances, well known process operations have not been described in detail to not unnecessarily obscure the present invention. While the invention will be described in conjunction with the specific embodiments, it will be understood that it is not intended to limit the invention to the embodiments.

Various techniques and mechanisms of embodiments of the present invention are described herein in singular form for clarity. However, it should be noted that some embodiments include multiple iterations of a technique or multiple instantiations of a mechanism unless noted otherwise. For example, a system uses a processor in a variety of contexts. However, it will be appreciated that a system can use multiple processors while remaining within the scope of the present invention unless otherwise noted. Furthermore, the techniques and mechanisms of the present invention will sometimes describe a connection between two entities. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

In recent years, the amount of ad impressions sold through real time bidding (RTB) exchanges has experienced a tremendous growth. RTB exchanges provide a technology for advertisers to algorithmically place a bid on any individual impression through a public or private auction. This functionality allows advertisers to buy inventory in a cost effective manner and to serve ads to the right person in the right context at the right time and price. However, in order to realize such functionality, advertisers need to intelligently evaluate each impression in real time or near real time. Demand-side platforms (DSPs) provide real time bid optimization techniques to help advertisers very quickly determine a bid value for each bid request that is sent from a seller of an impression. For instance, a DSP may determine a bid value in milliseconds or less for over a million bids per second based on information provided with each bid request that is sent from a publisher, for example, via an RTB exchange.

While some publishers provide bid requests that have a rich and diverse amount of associated data for facilitating the determination of bids, other publishers provide limited bid request information so that an accurate bid determination is hindered. By way of examples, a bid request's associated data may pertain to one or more of the following: user, media content, ad placement, publisher, and context. For instance, bid requests may include (or exclude) data related to media content type (such as video, music, text, game, etc.) or subject matter category (such as news, entertainment, educational, finance, sports, travel, etc.), brand safety (such as non-alcohol related), page quality (such as few images on the page), etc. A bid request may include (or exclude) data regarding ad placement data that specifies the impression's position or ad type within the particular media content (top, bottom, side, banner or pop-up, etc.). The bid request may include (or exclude) user data, such as demographics, geographical location, past user on-line activity, etc. The bid request may exclude (or exclude) various contextual information, including time of day, weather, etc.

In addition to an advertiser having the goal to purchase high quality impressions using a particular budget, the advertiser may have different relative values for bid requests that provide different amounts and types of bid request data. For example, an impression buyer who sells products through site X may wish to bid higher for users who have recently visited the site X through the publisher's site for which a bid request is being sent. In another example, a publisher may have knowledge of user demographics data that were obtained, for example, through a user registration process that is performed between users and the publisher. Additionally, some publishers may provide certain bid request data to direct buyers of impressions and not provide the same data to real time bidders in order to encourage buyers to directly purchase impression products. Additionally, the sending of each particular bid request and associated data has an associated cost to the publisher so that the publisher wishes to minimize bid request data sent to DSPs that cannot fill as many orders as other DSPs. For instance, a publisher may provide the identity of the complete web page URL (universal resource locator) of the media content and ad space to a direct purchaser of an ad space on such web page, while obscuring or hiding the entire or a portion of the web page URL of the ad space in a bid request for real time bidders.

One reason that advertisers often desire the publisher to provide more data with bid requests is so that the probability of conversion, which is calculated for determining a bid price, can be more accurately determined. Probability of conversion depends on past conversion rates of particular users with respect to particular media content and location, ad placement, and context. Conversions may take any suitable form, such as an advertisement viewer purchasing a product, filling out a form, signing up for e-mails, and/or performing some other type of action.

In order to incentivize publishers to provide more bid request information, certain embodiments of the present invention thereby facilitate the tying of bid price determination to whether certain data is provided in a bid request. More specifically, certain embodiments provide mechanisms and techniques for dynamic downward adjustment of bid pricing based on quantitative and qualitative factors with respect to the bid request data provided by impression sellers/publishers. A bid price for a bid request may be initially determined based on the information provided in the bid request and then decreased so as to penalize publishers who hide or exclude such specific bid request information. In contrast, the initial bid price may be maintained for publishers who provide specific bid request information with the bid request. In a rational market, publishers can achieve higher bid prices over time for providing more data with their bid requests, as compared to publishers who do not provide such data with bid requests.

In other embodiments, the bid price can be raised based on the amount of bid request data that is presented or the quality of the bid request data that is presented. For instance, a publisher who presents a fewer number of data values for data types that more closely correlate with higher conversion rates may result in a higher bid price than a publisher who presents a higher number of data values for data types that correlate less with conversion rates. In yet other implementations, budget allocation may also be adjusted (up or down) based on quantitative or qualitative factors pertaining to the bid request data.

FIG. 1A is a flow chart of a process 100 for adjusting a bid based on predefined penalty or bonus amounts in accordance with one embodiment of the present invention. According to various embodiments, the method 100 may be performed at a computing system configured to provide advertising campaign management services. For instance, the system may be configured to establish parameters for different advertising campaigns, to receive advertising opportunity bid requests from a real time bid exchange system via a network, to place bids on at least some of the received bid requests, and to evaluate the performance of the advertising campaigns.

This bid determination process of FIG. 1A is described with respect to a single bid request received and handled by a single DSP. However, it is understood that real-time bidding involves a large number of bid requests sent by a large number of different publishers to a large number of real-time bid exchange systems and respective DSPs or advertiser management systems.

Initially or periodically, one or more penalty amounts may be defined for one or more penalty variables in operation 101. For example, penalty amounts may be generated manually by a user, such as an advertiser or system administrator. Alternately, or additionally, penalty amounts may be generated automatically by the advertisement campaign management system.

Figure 1B:
FIG. 1B represents one example of a table for associating a set of penalty amounts for associated penalty or bonus variables in accordance with one embodiment of the present invention.

A single penalty amount may be predefined for each penalty variable or for a set of penalty variables using any suitable data structure. FIG. 1B represents one example of a table 150 for associating a set of penalty amounts for associated penalty variables. As shown, the penalty variables with each being associated with a penalty amount include user age, user gender, user income, URL of media content and ad space location, and ad position although any number and type of penalty variables may be associated with one or more penalty amounts. Some penalty variables may have the same penalty amount (e.g., $0.05 for Age and Gender; $0.10 for URL and Ad position), while other penalty variables may have different penalty amounts (e.g., $0.05, $0.08, or $0.10).

When bid prices are computed per ad and per advertiser, the importance of data or lack thereof may have a different computed value per ad or per advertiser. Thus, penalty amounts may be set up for each advertiser. Alternatively, a same set of penalty amounts may be set up for all or a portion of the advertisers that utilize a particular DSP. Additionally, different penalty amounts may be defined for different types of product lines.

Different penalty amounts may also be defined for different publishers or media channels. For instance, particular publishers may more reliable provide accurate data than other publishers. In one example, social network sites tend to have more reliable user designations of gender or other user-provided demographic data than some search sites. Thus, advertisers may care more that certain publishers provide certain types of data than other publishers, and these certain publishers may be penalized more for missing data than other publishers. By way of examples, different penalty amounts may be defined for any combination of different variables, advertisers, publishers, market lines, media channels, devices, applications, geographies, dates, times, ad formats, ad placements, content, and context, etc.

Referring back to FIG. 1A, one or more bonus amounts may be alternatively or additionally predefined for one more sets of bonus variable in operation 101. In some situations, a bid may be increased for a bid request that has quantitatively less data with a higher qualitative value than another bid request. For instance, certain data types may be more valuable than other data types. The data types that most closely correlate to a conversion may be more valuable when present in a bid request than a higher number of other bid types that are not closely correlated to a conversion. In a specific example, a bid request with the two most highly correlated data types may be valued higher than a bid request having the three least or lesser correlated data types.

Figure 1C:
FIG. 1C represents a specific example of a data structure for associating a set of bonus amounts with associated sets of bonus variables in accordance with one embodiment of the present invention.

This relative worth of certain data types may be factored into a set of predefined bonus values for these certain data types in any suitable manner. A single bonus amount may be predefined for each set of one or more variables using any suitable data structures FIG. 1C represents a specific example of a data structure 170 for associating a set of bonus amounts with associated sets of bonus variables in accordance with one embodiment of the present invention. As shown, different sets of bonus variables may be associated with different bonus amounts. The age and gender set is associated with a $0.30 bonus amount, while the single age variable is merely associated with a $0.05 bonus amount. The bonus data structure 170 may include other sets of bonus variables and predefined bonus amounts as shown. In sum, each variable may be individually or collectively (with other one or more variables) associated with a bonus amount, while other variables may not be associated with a bonus amount. Additionally, a particular variable may be associated with different penalty and bonus amounts for different sets of variables in which such variable is included. Additionally, bonus amounts may vary with different publishers, different advertisers, or in any number of ways, for example, as described above with respect to penalty amounts.

Referring back to FIG. 1A, a bid request having data for a first set of variables may then be received in operation 102. The data for a first set of variables may include a user ID and media content ID (e.g., u and w). User profile and/or media content profile data may also be provided by the publisher with the bid request.

The user profile of user u may include any characteristics that were, are, or can be associated with the particular user u. To protect a user's privacy, user profile data may be stored with an anonymized type of user identifier, such as an arbitrary or randomized identity, rather than the user's actual name, specific residency, or any other type of user identifying information. Examples of user profile data for the particular anonymized user u may include descriptive data, such as personal or professional interests, employment status, home ownership, knowledge of languages, age, education level, gender, race and/or ethnicity, income, marital status, religion, size of family, field of expertise, residential location (country, state, DMA, etc.), travel location, or predictive data, such as likelihood to consume content or perform an activity, such as clicking on an ad, visiting a page or purchasing a product or service, in the near future, etc.

The user profile data may also include browsing history information, such as pages visited, amount of time per page viewing, links clicked on, searches performed, actions or interactions taken, amount and type of purchases made, etc. The browsing history information may be expressed using any suitable one or more metrics, such as count, absolute or relative value, average, mean, frequency, time duration, etc. The user profile of user u may also include contextual data, such as where the user is currently located, the weather at such location, current events at such location, etc. For instance, the ad request may include a GPS (global positioning satellite) value or access point location for the user u, and other contextual data may be scraped from other databases, such as a weather or entertainment event web site for such location. The media content profile may identify various characteristics of the web page or ad space or ad placement that is available for purchase, such as one or more content category, ad placement position (e.g., top, side, or bottom of page), ad type (e.g., banner, video, pop-up), brand safety (e.g., absence of alcohol, violence, drugs, competitive brands), page quality (e.g., absence of cluttering images, prominent display of the ad), etc.

Some data that is related to the bid request may be only known by the seller and not obtainable by the DSP unless the seller provides such data in the bid request. For example, the publisher may retain data regarding whether the user has visited a particular on-line web site through the publisher's site. Other data related to the bid request may be obtainable by the DSP from sources other than the bid request. For instance, the DSP may obtain user demographics data based on a provided user ID or media content ID provided in the bid request.

Referring back to the illustrated embodiment, user profile and media content profile data that pertains to the bid request data may be retrieved in operation 104. For example, this retrieval process may be performed to obtain user or media content data that was not provided in the bid request if a user ID and/or media content ID (u and w) is provided in the bid request and user and media content profile data is retrievable. For instance, the DSP retrieves user and media content profiles (and/or other type of data) that were previously stored and mapped to the user ID and media content ID (u and w) provided in the bid request. However, either profile may also be empty if u or w is new to DSP or if u or w is not provided in the bid request sent to DSP.

In general, the DSP may run various advertisement optimization algorithms to find the best ad for u and w of the bid request. This advertisement optimization may include optimizing for the ads' campaign goals while satisfying constraints. The DSP may work with a variety of advertisers who utilize different campaign types. The campaigns may utilize performance goals for each package or segment of users or media content. That is, different packages may have a different set of constraints and different performance metric goals. A performance metric may include a cost-per-click (CPC), cost-per-action (CPA), click-through-rate (CTR), or action-rate (AR) although CPA is used herein to refer to any type of performance metric or goal. The packages of a particular campaign may have the same ad or a custom ad for the particular segment of users or media content.

In some implementations, techniques and mechanisms may be described herein as solving "optimization" problems or as "optimizing" one or more parameters. It should be noted that the term optimize does not imply that the solution determined or parameter selected is necessarily the best according to any particular metric. For instance, some optimization problems are computationally intense, and computing the best solution may be impractical. Accordingly, optimization may involve the selection of a suitable parameter value or a suitably accurate solution. In some instances, the suitability of a parameter value or solution may be strategically determined based on various factors such as one or more computing capabilities, problem characteristics, and/or time constraints.

The DSP may filter ads based on each ad's associated ad constraints in operation 106. For instance, one particular ad constraint specifies that this particular ad only applies to users from California. Accordingly, if the ad request has a user u, who is from Oregon, this particular ad is filtered out from the candidate ads. In contrast, if another ad has an associated constraint specifying users from Oregon, this other ad is not filtered out for the ad request for an Oregon user and such other ad is deemed to be a candidate ad for further bid processing.

Bids may then be determined for each of the filtered ads based on the ad's associated campaign parameters, including goals such as a CPA, in operations 108. For an ad having a CPA, the bid b may be computed as:

$$b = p(u;w;a) \times CPA$$

where p(u;w; a) is the probability of action given u, w, the ad a, and optionally other related parameters in the bid computation context. This probability may be computed using any suitable techniques, such as a machine learning algorithm. Several example techniques are described in the paper: D. Agarwal, R. Agrawal, and R. Khanna, "Estimating rates of rare events with multiple hierarchies through scalable log-linear models", ACM SIGKDD Conf. on Knowledge Discovery and Data Mining, 2010, which paper is incorporated herein by reference for providing a technique for determining probability of an actions, such as user conversion or other actions with respect to impressions.

Of course, CPA may be replaced with a CPC or CPM value (converted to a cost per impression). At least some input for determination of this probability p is provided in the bid request itself. In the CPM example, the bid b may be set equal to the advertiser specified CPM minus the fees charged by the DSP.

Going back to FIG. 1A, it may then be determined whether the bid request is missing data for any penalty variable in operation 109. For instance, it is determined whether each penalty variable that is associated with a penalty amount has corresponding data in the bid request. If the bid request is missing data for a penalty variable, each bid may be adjusted by the defined penalty amount that was defined for the missing data's penalty variable in operation 110. Otherwise, the bid is not adjusted by a decreasing penalty amount.

If the bid request is missing age information in a simple bid request example, bid that is determined for such bid request may be decreased by $0.05 as illustrated by table 150 of FIG. 1B. Additionally, if the bid request is missing gender data, the bid may also be reduced by another $0.05. For instance, if the bid is calculated as $1 for a particular bid request that is missing gender and age data, the bid may be decreased by $0.10 ($0.05+$0.05) to a decreased bid value of $0.90. In alternative embodiments, the bid may be decreased by a single amount (e.g., 1 cent) for each piece of missing data, rather than by multiple penalty amounts for multiple missing pieces of data. In alternative embodiments, the bid per ad may be decreased by a cumulative percentage of each piece of missing data.

The bid can be said to be a measure of how much value a DSP puts on this advertisement opportunity, factoring in penalties for missing bid request data. Since the initial calculation of the bid is already based on the data that is present in a bid, the initial bid is affected by the absence of data in that lower bids are determined for less data, even for the same ad campaign. When the bid is then again decreased in response to missing data, the bid value can be said to be lowered twice based on the missing data. That is, a first bid may be initially determined for a particular ad campaign and this first bid request's particular set of data. This first bid is lower than a second bid that is determined for the same ad campaign and another second bid request having the same particular set of data plus additional data. For example, the first bid is equal to the second bid minus X. The first bid is again decreased based on the missing data, which is missing compared to the second bid request's data. For example, the first bid is the decreased by Y or by a particular percentage of the initial bid X. In effect, the publisher who sends the first bid request is doubly penalized because of the first bid request's missing data, as compared to data sent by the publisher in the second bid request (i.e., the second bid request has variable data that is missing from the first bid request).

A publisher who observes drops in bid price may investigate the source of the bid price and determine that the drop is due to missing data. For example, the publisher may try different bid request data amounts to determine that decreases in data amounts are correlated with bid price drops. The publisher may then decide to provide the missing data in order to receive higher bid prices. If a majority or all of the bids for a DSP, which handles a high number of bid requests, are decreased when bid requests exclude data (such as obscuring the URL or leaving out user data, such as gender), a publisher who works with such DSP may receive a significant number of lower bid prices for missing data, which thereby motivates the publisher to provide more bid request data.

After or concurrently with assessing each bid for whether to decrease by one or more predefined penalty amounts, each bid may also be assessed for whether to increase by one or more predefined bonus amounts. For instance, it may be determined whether the bid request has data for any set of bonus variables in operation 114. For instance, it is determined whether each set of bonus variables that are associated with a bonus amount has corresponding data in the bid request. If the bid request includes data for a bonus set of variables, each bid may be adjusted by the defined bonus amount that was defined for the present data's set of bonus variables in operation 116. Otherwise, the bid is not adjusted by a increasing bonus amount.

If the bid request includes both age and gender information in a simple bid request example, a bid that is determined for such bid request may be increased by $0.30 as illustrated by table 170 of FIG. 1C. The bid may also be increased by $0.05 corresponding to the bonus amount corresponding to only the age variable. Additionally, if the bid request includes income, gender, and zipcode data, the bid may also be increased by another $0.20. For instance, if the bid is calculated as $1 for a particular bid request that includes age, gender, income, and zipcode data, the bid may be increased by $0.50 ($0.30+$0.20) to a increased bid value of $1.50. In alternative embodiments, the bid may be increased by a single bonus amount for overlapping sets of bonus variable sets (e.g., $0.30 for data for the age and gender set), rather than by multiple bonus amounts for such multiple overlapping sets of data (e.g., $0.30 for the age and gender set plus $0.05 for the age set). In alternative embodiments, the bid per ad may be increased by a cumulative percentage of each set of present data.

A bid value can be increased over the initial value that is calculated for the advertisement opportunity. The initial bid is affected by the presence of data, and such initial bid can be increased again based on the value of particular sets of data being present. Thus, a publisher may be compensated twice for supplying particular valuable sets of data. Alternatively, bids may be only assessed for an upwards adjustment, while not being assessed for a downwards adjustment or vice versa.

After each bid is assessed for whether to decrease by a penalty amount based on missing data or increase by a bonus amount based on present data, the best bid and its associated ad specifications may be found and sent to the ad exchange system, which sent or forwarded the bid request, in operation 118. For example, the DSP responds back to the bid request sender, e.g., RTB exchange, with its best bid and information on the corresponding ad, specifying how to retrieve the best bid's ad's creative content (e.g., the actual image corresponding to the ad). The RTB exchange then sends its best bid (selected from all DSP best bids) back to the bid request sender (or publisher).

Figure 2:
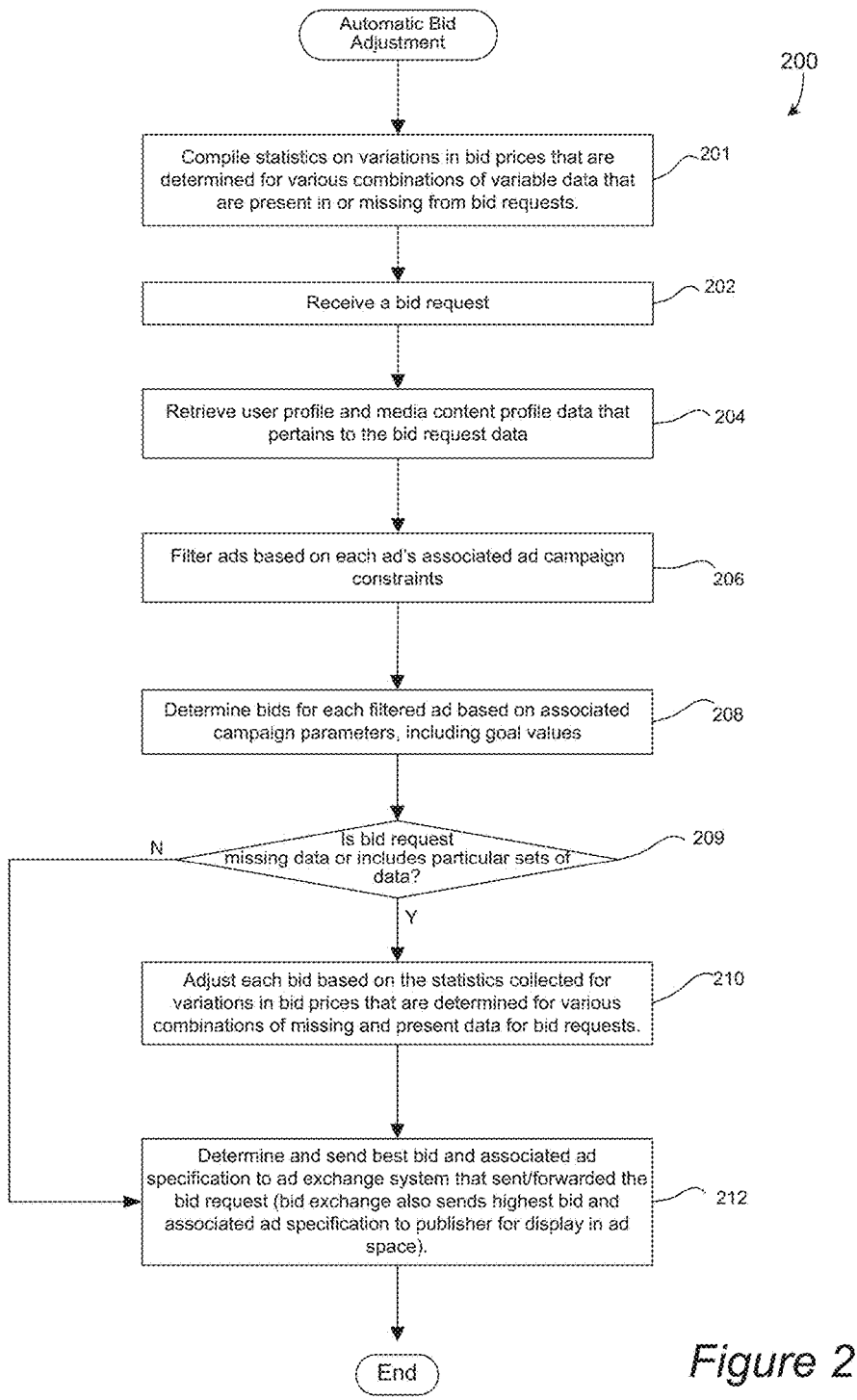
FIG. 2 is a flow chart of a process for automatically adjusting a bid based on dynamically updated penalty amounts in accordance with an alternative embodiment of the present invention.

In other embodiments, the penalty and/or bonus amounts are not predefined, but are determined on the fly based on collected bid statistical information. FIG. 2 is a flow chart of a process for automatically adjusting a bid based on dynamically updated penalty and/or bonus amounts in accordance with an alternative embodiment of the present invention. As shown, statistics on variations in bid prices that are determined for various combinations of variable data that are present in or missing from bid requests may be compiled in operation 201.

Figure 3:
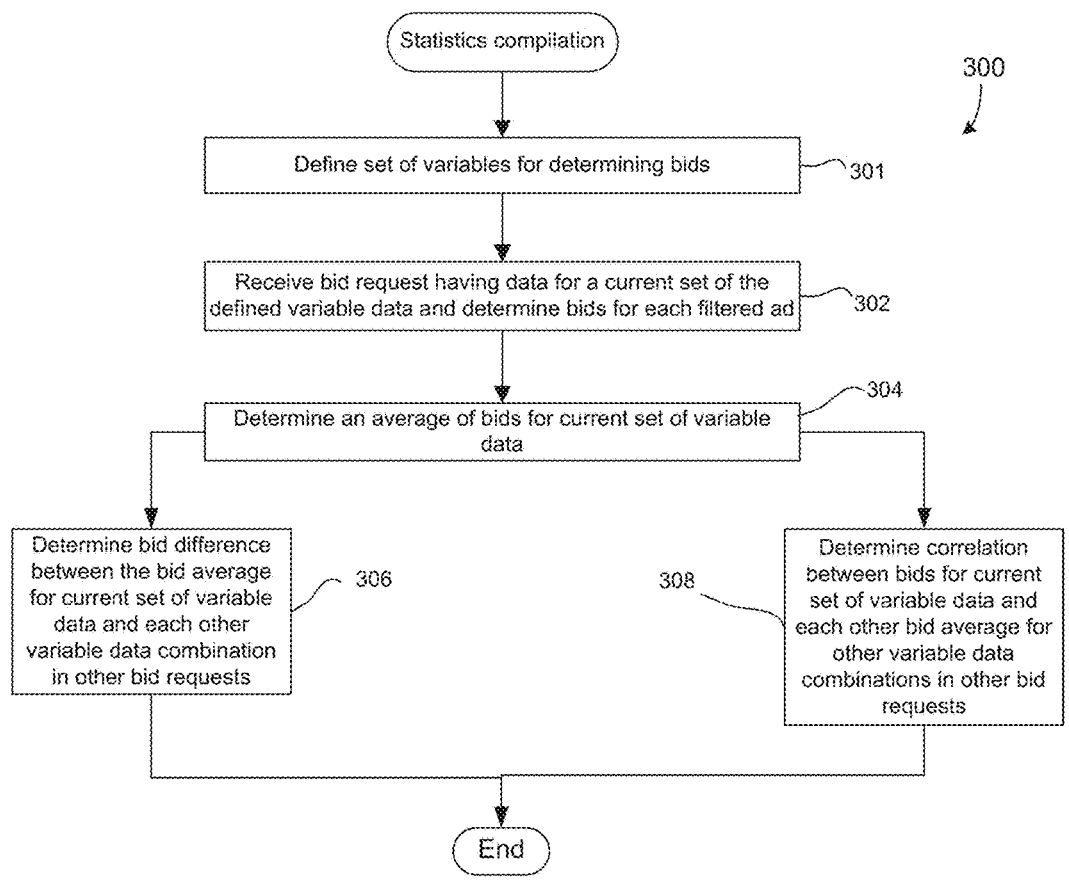
FIG. 3 is a flow chart of a procedure for compiling statistics for bid price variation resulting from different combinations of data from bid requests in accordance with specific implementations of the present invention.

Any suitable technique may be used to determine metrics for variations in bid prices resulting from missing data, as compared to bid requests that contain such missing data. FIG. 3 is a flow chart of a procedure 300 for compiling statistics for bid price variation resulting from different combinations of data from bid requests in accordance with specific implementations of the present invention.

Initially or periodically, a set of variables for determining bids may be defined in operation 301. For instance, a predefined list of variables that are expected or desired to be present in bid requests may be defined, for example, by a user or administrator, or automatically through statistical analysis of the bid requests that are processed by a DSP or multiple DSPs. Alternatively, a predefined list of variables that are not expected to be present in bid requests may be defined.

The following process 300 illustrates a simplified example technique for implementing with respect to each received bid request and is repeated for multiple bid requests to compile the statistical information. As shown, a bid request having data for a current set of the defined variable data may be received and bids determined for each filtered ad in operation 302, for example, as described above.

An average of the bids for the current set of variable data may then be determined in operation 304. As bid requests having the same set of variables are received, an average (or mean) bid price may be maintained. Other suitable metrics, such as standard deviation, may also be tracked.

The variation between the bid prices for different combinations of missing and present variable data in bid requests may be determined using any suitable technique. Two techniques 306 and 308 are shown in FIG. 3. Either technique or a combination of both techniques may be implemented to determine bid variation.

In a first technique, a bid difference between a bid average for the current set of variable data and each other bid average for other variable data combinations in other bid requests may be determined in operation 306. In a simplified example, the predefined list of variables includes variables A, B, and C, and the current set of variable data includes data for only variables A and B but not C. An average bid price is determined for bid requests with data for variables A and B, but not C. Averages are also maintained for bid requests having other variable data combinations that include C: (i) A, B, and C, (ii) A and C, (iii) A, (iv) B, (v) B and C, and (vi) C. Average bid differences may then be determined between the average bid prices for bid requests with the current data set A and B, and not C, and each of the combinations (i)~(vi). For a particular bid request having data for variables A and B, but not C, the determined particular bid request's bid for a particular ad may be decreased by a penalty amount that is proportional to the average difference between the current bid request's average bid price and the average bid prices for bid requests having variable data C (groups (i), (ii), (v), and (vi). Alternatively, the average difference may be determined with respect to the group that includes all the data (i) and the average for missing variable data C. In a bonus type application, a similar technique can include comparing average from a current data set that includes particular data (e.g., A and B) to the averages for all other data sets that do not include such particular data (e.g., groups ii~v and groups that excludes A, B, and C).

In a second technique, a correlation between bids for current set of variable data and each other bid average for other variable data combinations in other bid requests may be determined in operation 308. Any suitable correlation metric may be determined. Example correlation metrics may include a Pearson product-moment correlation coefficient, rank correlation coefficients, such as the Spearman or Kendall ranked correlation coefficient, a distance or Brownian covariance, etc.

Referring back to FIG. 2, operations for handling a single bid request will now be described although these operations are applied to multiple bid requests based on the collected statistical information. A bid request may be received in operation 202. A bid request may include any suitable type of data for any combination of variables as described further herein, for example, with respect to operation 102 of FIG. 1A. User profile and/or media content profile data that pertains to the bid request data may also be retrieved in operation 204 (similar to operation 104 of FIG. 1A). Ads may then be filtered based on each ad's associated ad campaign constraints in operation 206 (similar to operation 106 of FIG. 1A). Bids for each filtered ad may then be determined based on associated campaign parameters, including goal values, in operation 208 (similar to operation 108 of FIG. 1A).

It may then be determined whether there is any missing data or contains particular sets of bonus data in operation 209. Any suitable technique may be used to determine whether a bid request is missing data or includes particular sets of data, for example, as compared to other bid requests. In one embodiment, a predefined list of variables that are expected to be present in bid requests is provided, for example, by a user or administrator, or automatically through statistical analysis of the bid requests seen by a DSP or multiple DSPs. A list of variables may also be defined by analysis of bid requests and the variables that are present in significant portions of the bid requests.

Each bid may then be adjusted based on the collected statistics for variations in bid prices that were determined for various combinations of missing and present data for bid requests. in operation 210. For example, the bid may then be adjusted based on a correlation or average metric between different bid prices for different sets of variable data. In one example, if it was determined that the bid average difference for bid requests with variable X data and bid requests without variable X data has a Y value, the current bid value, e.g., Z, may be adjusted based on the Y value. For instance, current bid value is decreased by Y or a predefined percentage of Y (0.5×Y, 2Y, etc.). In other examples, the bid average difference for bid requests with variable X data and bid requests without such variable X data may be determined and used to increase the bid amount by such difference.

The best bid and associated ad specification may then be determined and sent to the ad exchange system that sent or forwarded the bid request in operation 212 (similar to operation 118 of FIG. 1A). Out of all bids that are received by a bid exchange from all associated DSPs, the bid exchange may also send the highest bid out of the determined bids and associated ad specification to the publisher for display in the ad space.

Moreover, a campaign budget can be periodically allocated to different packages of a campaign using an algorithm. The periodic allocation can consider the spend amount and performance levels of each package for allocating more or less budget to these packages. The allocation amounts for each package may also be adjusted based on penalty and/or bonus amounts associated with bid request data that meets the constraints of each package. Example budget allocation techniques are further described in U.S. patent application Ser. No. 14/060,862, filed 23 Oct. 2013 by Ali Jalali et al. and U.S. patent application Ser. No. 14/259,045, filed 22 Apr. 2014 by Sahin Cem Geyik et al. These applications are incorporated herein by reference in their entirety.

Certain embodiments of the present invention allow advertisers to incentivize publishers to provide more data or specific kinds of data in bid requests. Since there are generally more impressions than can be filled, bid prices can be decreased for bid requests with missing data and still likely have enough impressions to meet advertiser demand. Since bid requests having more data will result in non-penalized or bonus bid prices, the publishers will be motivated to provide more data so that bid prices are not decreased because of missing data.

Figure 4:
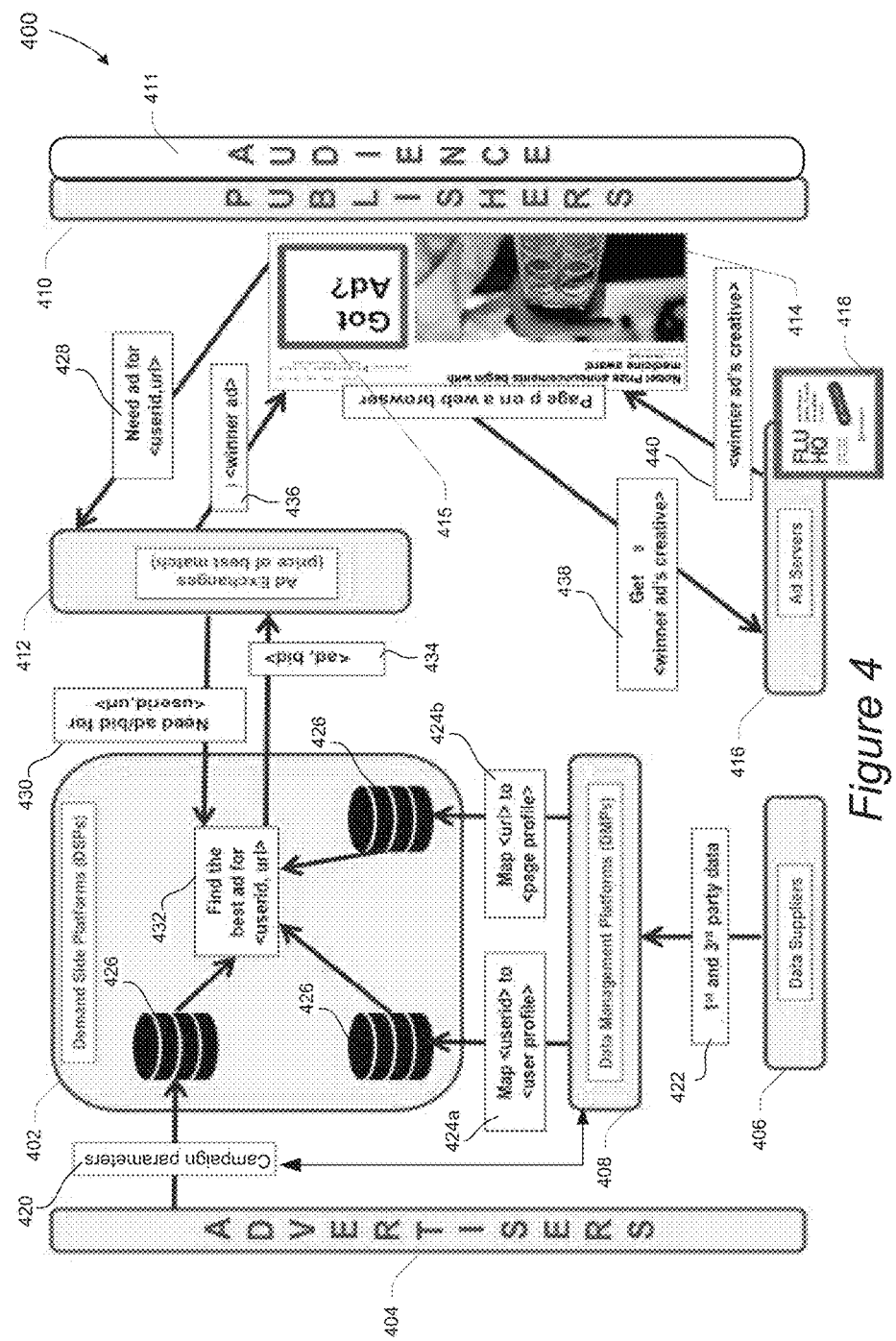
FIG. 4 is a diagrammatic representation of a simplified computer network in which advertisement processes may be implemented.

Techniques of the present invention may be practiced in any networking environment. FIG. 4 is a diagrammatic representation of an example advertisement system in which techniques of the present invention may be implemented. A real-time bidding flow will be generally described with respect to this system 400. At a high level, this flow can be considered in three main sections: the demand side on the left, the ad exchange 412 in the middle, and the supply side on the right. In reality, a real-time bidding ecosystem is fairly complex and may include any suitable number and type of components for providing advertisements to audience users.

Publishers 410 may provide any suitable type of displayable, executable, audible, or visual media content to users/audience 411 via a user's physical device or on the publisher's device or system. For example, media content may include videos, music, text, games, etc. The content may also pertain to various categories, such as news, entertainment, educational, finance, sports, travel, etc. In a specific implementation, publishers provide media content, such as web pages, from server devices to client devices that are accessible by audience members/users. Example client devices include tablet computing devices, laptop computing devices, personal digital assistant (PDA) devices, mobile phones (e.g., smart phones), desktop computer, televisions, wearable computers, household devices, etc. Each client device may be configured with any suitable hardware and/or software (e.g., browsers and browser add-ins plug-ins, operating systems for downloading and execution of apps on mobile devices) that operate in cooperation with the publisher devices/systems for receiving and presenting media content.

Prior to providing requested media content to users 411, the publishers 410 may also sell ad spaces with respect to such media content. Advertisers 404 at the demand side have ads to place with publisher-provided media content. For instance, an advertiser 404 pays to have an ad placed in an ad space of a particular web page that is sold by a publisher. Although the following system 400 and flow is described with respect to ad spaces in web pages, the following processes may be implemented for other types of ad spaces in other types of media, such as mobile device apps, games, coupons, videos, etc.

Publishers 410 may be implemented via one or more presentation servers that are also configured to aggregate various online advertising data from several data sources. The online advertising data may include live internet data traffic that may be associated with users, as well as variety of supporting tasks. For example, the online advertising data may include one or more data values identifying various impressions, clicks, data collection events, and/or beacon fires that may characterize interactions between users and one or more advertisement campaigns. As discussed herein, such data may also be described as performance data that may form the underlying basis of analyzing a performance of one or more advertisement campaigns. In some embodiments, presentation servers may be front-end servers that may be configured to process a large number of real-Internet users, and associated SSL (Secure Socket Layer) handling. The front-end servers may be configured to generate and receive messages to communicate with other servers in system 400. In some embodiments, the front-end servers may be configure to perform logging of events that are periodically collected and sent to additional components of system 400 for further processing.

Presentation servers may be communicatively coupled to one or more data sources, such as client browser and other servers in the system 400. In some embodiments, each browser may be an Internet browser that may be running on a client machine associated with a user. Thus, a user may use a browser to access the Internet and receive advertisement content. Accordingly, various clicks and other actions may be performed by the user via a browser. Moreover, each browser may be configured to generate various online advertising data. For example, various cookies, advertisement identifiers, beacon fires, and user identifiers may be identified by a browser based on one or more user actions, and may be transmitted to presentation servers for further processing. Various additional data sources may also be communicatively coupled with presentation servers and may also be configured to transmit similar identifiers and online advertising data based on the implementation of one or more advertisement campaigns by various advertisement or ad exchange servers, such as ad exchange system 412 or demand side platform (DSP) 402.

The ad exchange system 412 generally runs an auction to determine a price of a match between an ad and a web page. In essence, ad exchanges are the markets providing mechanisms for facilitating bidding processes between the demand and supply sides. The ad exchanges may be implemented on any suitable number and type of computing devices.

Demand side platforms (DSPs) 402 may be generally configured to manage advertising campaigns on behalf of advertisers 404 although some advertisers may also work directly with ad exchanges. Given a user requesting a particular web page, a DSP 402 is able to find the best ad for the user (411). The best ad may be selected from the ads managed by the DSP as described above. For each ad selected, various constraints (mostly selected by the advertisers, but some by the ad exchange, the publisher, and the DSP) are met.

DSP may receive and store user and page profiles in an accessible profile database (such as 426 of FIG. 4), which may be implemented by any suitable type and number of storage devices. The DSPs 402 may obtain the user profile and page profile data from a plurality of data management platforms (DMPs) 408, which may be configured to aggregate and data-mine all kinds of advertising and non-advertising data. One specific use of DMPs is to extend the audience known to an advertiser through analysis of various audience data from various third-party data vendors. A DSP may be integrated with its DMP or other third-party DMPs.

One or more DMPs may generally be configured to receive one or more records from various data sources that characterize the user actions and data events described above. In some embodiments, the records may be log files that include one or more data values characterizing the substance of the user action or data event, such as a click or conversion. The data values may also characterize metadata associated with the user action or data event, such as a timestamp identifying when the user action or data event took place. According to various embodiments, a DMP may be further configured to transfer the received records, which may be log files, from various end points, such as presentation servers, browsers, and servers, to a data storage system, such as data storage system 426. Accordingly, a DMP may be configured to handle the transfer of log files from various end points located at different locations throughout the world to data storage system 426 as well as other components of system 400. In some embodiments, a DMP may be configured and implemented as a MapReduce system that is configured to implement a MapReduce job to directly communicate with a communications port of each respective endpoint and periodically download new log files.

The user and media content profile data may be obtained or accessible as $1^{st}$ and $3^{rd}$ party data (422) from various data suppliers (406), such as first parties (the advertisers themselves) or third parties (independent data suppliers). In the example of FIG. 4, the DSPs 402 may obtain mappings between user profile data and user IDs (424*a*) and mappings between page profile data and universal resource locators or URLs (424*b*). As described above, user and/or media content profile data may be provided in bid requests by the publisher.

The user profile data is preferably fully anonymized so as not to contain any personally identifiable information. For instance, a user login, device identity (such as MAC address) may be associated with user profile information, which does not include the user's actual name or address, etc. Similarly, a unique identity for the specific media content (and/or ad space) may be associated with specific characteristics.

Advertisers who work with a DSP may provide campaign parameters or specifications (420) to the DSP. The advertisers may specify any suitable campaign parameters for running a particular ad campaign. For each campaign, an advertiser may specify at least a budget, an ad, a goal, and a set of constraints, sometimes referred to as targeting or contextual constraints. An ad campaign's budget may be specified to be spent over a given time period, sometimes referred to as a budget schedule.

For a branding type campaign, the idea may be to reach as many unique users as the campaign budget affords at a cost per impression. This goal may be expressed as CPM, the cost per mille or one thousand impressions. For a performance type campaign, the advertiser may wish to reach as many unique users as the campaign budget affords but to do so while keeping within certain performance goals. The performance goals may be expressed as CPC or CPA, the cost per click or the cost per action or conversion, respectively, although there may be other performance goals depending on the media content type, e.g., cost per engagement for a video advertisement. The goal associated with a segment of users may reflect the value of reaching those users for the advertiser. In advertising terminology, the part of the campaign customized to this segment of users is sometimes called a package. The term CPA may be used herein for both CPA and CPC for brevity and without loss of generality.

An advertiser may also specify targeting constraints for an ad campaign as described further above. In general, constraints may specify what kind of users to reach on what kind of media content, how long to run the campaign, etc. A single user constraint can serve to partition a set of users into user segments that include users who satisfy the constraint and users who do not. In general, constraints can be based on any combination of characteristics from a particular user's profile, a particular media content profile, or other parameters that are obtainable for a particular ad request. Example constraints may pertain to user demographics, user browsing history, user geographic location data, media content categories, ad or ad space/placement characteristics, user contextual parameters (e.g., weather, time of day, stock market indexes, etc.), advertiser categories, etc. In general, user contextual parameters may include any contextual parameter that may affect a user or advertiser's behavior.

The terms "advertisement server" and "advertiser" are used herein generally to describe systems that may include a diverse and complex arrangement of systems and servers that work together to display an advertisement to a user's device. For instance, this system will generally include a plurality of servers and processing nodes for performing different tasks, such as bid management, bid exchange, advertisement and campaign creation, content publication, etc. Referring back to FIG. 4, a publisher 410 may also work with an ad exchange 412 to find bid for advertisers to sell ads for use in the publisher's pages. When a user u with a user ID <userid> is about to view a web page w 414 with URL <url> from the publisher, the publisher sends an ad request 428 for an ad to be sold for a particular ad space 415 of the web page w 414 to the ad exchange 412. The ad exchange 412 passes the request 430 to all partner DSPs 402.

In various embodiments, system 400 may include various components, such as DMP 408 or DSP 402, which may be configured to receive and process data from various data sources to enable the scalable incorporation of large amounts of data, which may be first or third party data, into a data storage system, such as data storage system 426. Such receiving and processing of data may be implemented to incorporate large amounts of first and/or third party data with data stored and maintained by an online service provider, such as Turn® Inc. of Redwood City, Calif. This ingested data may be processed such that subsequent joining of the data may be performed in a scalable fashion capable of handling the large amount of first and/or third party data that has been received.

In various embodiments, DMP 408, DSP 402, or any of its respective components may include one or more processing devices configured to process data records received from various data sources. In some embodiments, these data-ingesting components may include one or more communications interfaces configured to communicatively couple such data-ingesting components to other components and entities, such as a data storage system. Furthermore, DSP 402 and/or DMP 408 may each include one or more processing devices specifically configured to process performance data associated with data events and online users. In one example, DSP 402 and/or DMP 408 may include several processing nodes, specifically configured to handle processing operations on large data sets. In another example, DMP 408 may include big data processing nodes for processing large amounts of performance data in a distributed manner. In one specific embodiment, DMP 408 may include one or more application specific processors implemented in application specific integrated circuits (ASICs) that may be specifically configured to process large amounts of data in complex data sets, as may be found in the context referred to as "big data."

In some embodiments, the one or more processors may be implemented in one or more reprogrammable logic devices, such as a field-programmable gate array (FPGAs), which may also be similarly configured. According to various embodiments, DSP 402 and DMP 408 may each include one or more dedicated processing units that include one or more hardware accelerators configured to perform pipelined data processing operations. For example, operations associated with the generation of data provider records and bid amount or bid allocation statistical data may be processed, at least in part, by one or more hardware accelerators included in DMP 408 or DSP 402.

In various embodiments, such large data processing contexts may involve performance data stored across multiple servers implementing one or more redundancy mechanisms configured to provide fault tolerance for the performance data. In some embodiments, a MapReduce-based framework or model may be implemented to analyze and process the large data sets disclosed herein. Furthermore, various embodiments disclosed herein may also utilize other frameworks, such as .NET or grid computing.

In various embodiments, system 400 may include data storage system 426. In some embodiments, data storage system 426 may be implemented as a distributed file system. As similarly discussed above, in the context of processing online advertising data from the above described data sources, there may be many terabytes of log files generated every day. Accordingly, data storage system 426 may be implemented as a distributed file system configured to process such large amounts of data. In one example, data storage system 426 may be implemented as a Hadoop® Distributed File System (HDFS) that includes several Hadoop® clusters specifically configured for processing and computation of the received log files. For example, data storage system 426 may include two Hadoop® clusters where a first cluster is a primary cluster including one primary namenode, one standby namenode, one secondary namenode, one Jobtracker, and one standby Jobtracker. The second node may be utilized for recovery, backup, and time-costing query. Furthermore, data storage system 426 may be implemented in one or more data centers utilizing any suitable multiple redundancy and failover techniques.

In various embodiments, system 400 may also include database system 426 which may be configured to store data generated by DSP 402. In some embodiments, database system 426 may be implemented as one or more clusters having one or more nodes. For example, database system 426 may be implemented as a four-node RAC (Real Application Cluster). Two nodes may be configured to process system metadata, and two nodes may be configured to process various online advertisement data, which may be performance data, that may be utilized by DSP 402. In various embodiments, database system 426 may be implemented as a scalable database system which may be scaled up to accommodate the large quantities of online advertising data handled by system 400. Additional instances may be generated and added to database system 426 by making configuration changes, but no additional code changes.

In various embodiments, database system 426 may be communicatively coupled to console servers (e.g., for DSP 402 or DMP 408) which may be configured to execute one or more front-end applications. For example, console servers may be configured to provide application program interface (API) based configuration of advertisements and various other advertisement campaign data objects. Accordingly, an advertiser may interact with and modify one or more advertisement campaign data objects via the console servers. In this way, specific configurations of advertisement campaigns may be received via console servers, stored in database system 426, and accessed by advertisement servers 216 which may also be communicatively coupled to database system 426. Moreover, console servers may be configured to receive requests for analyses of performance data, bid statistical data, and may be further configured to generate one or more messages that transmit such requests to other components of system 400.

Embodiments of the present invention may be implemented in any suitable network systems. The network may take any suitable form, such as a wide area network or Internet and/or one or more local area networks (LAN's). The network may be in the form of a data, mobile, cellular, plain old telephone network (POTN), or any combination thereof. Referring back to FIG. 4, the network 400 may include any suitable number and type of devices, e.g., routers and switches, for forwarding requests from each client to a particular server application, forwarding application results back to the requesting clients, or forwarding data between various servers or processing devices.

Embodiments of the present invention may also be practiced in a wide variety of network environments including, for example, TCP/IP-based networks (e.g., Rate Control Protocol or RCP, Transport Control Protocol or TCP, Fast TCP, Stream-based TCP/IP or STCP, eXplicit Control Protocol or XCP, etc.), telecommunications networks, wireless networks, mobile networks, etc., or any combination thereof. In addition, the computer program instructions with which embodiments of the invention are implemented may be stored in any type of computer-readable media, and may be executed according to a variety of computing models including a client/server model, a peer-to-peer model, on a stand-alone computing device, or according to a distributed computing model in which various of the functionalities described herein may be affected or employed at different locations.

The disclosed techniques of the present invention may be implemented in any suitable combination of software and/or hardware system, such as a web-based server or desktop computer system. An apparatus for implementing one or more portions of this invention may be specially constructed for the required purposes, or it may be a general-purpose computer selectively activated or reconfigured by a computer program and/or data structure stored in the computer. The processes presented herein are not inherently related to any particular computer or other apparatus. In particular, various general-purpose machines may be used with programs written in accordance with the teachings herein, or it may be more convenient to construct a more specialized apparatus to perform the disclosed method steps.

Figure 5:
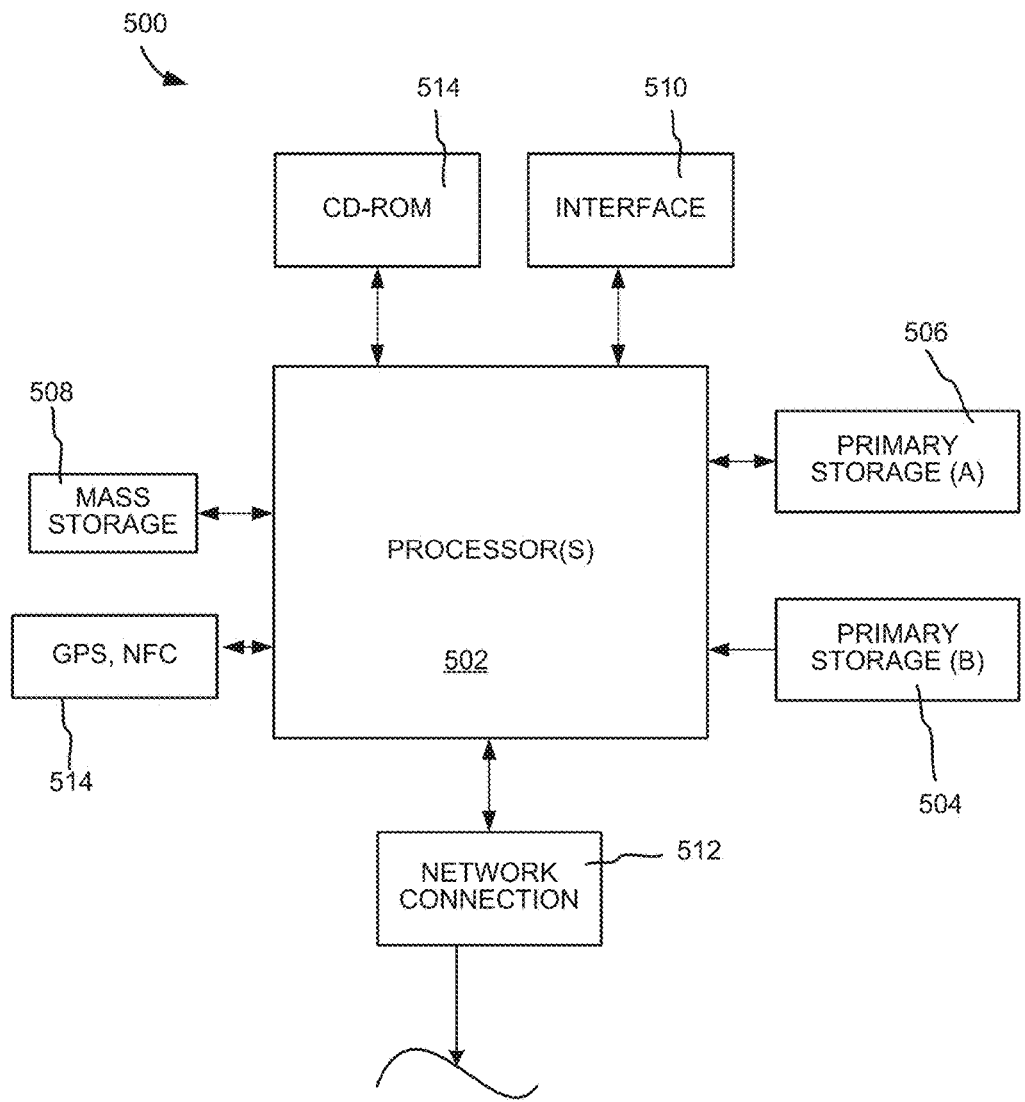
FIG. 5 illustrates a typical computer system that, when appropriately configured or designed, can serve as a system for implementing at least portions of the process embodiments described herein.

FIG. 5 illustrates a typical computer system that, when appropriately configured or designed, can serve as a bid determination system for implementing at least portions of the process embodiments described herein. The computer system 500 includes any number of processors 502 (also referred to as central processing units, or CPUs) that are coupled to storage devices including primary storage 506 (typically a random access memory, or RAM), primary storage 504 (typically a read only memory, or ROM). CPU 502 may be of various types including microcontrollers and microprocessors such as programmable devices (e.g., CPLDs and FPGAs) and unprogrammable devices such as gate array ASICs or general-purpose microprocessors. As is well known in the art, primary storage 504 acts to transfer data and instructions uni-directionally to the CPU and primary storage 506 is used typically to transfer data and instructions in a bi-directional manner. Both of these primary storage devices may include any suitable computer-readable media such as those described herein. A mass storage device 508 is also coupled bi-directionally to CPU 502 and provides additional data storage capacity and may include any of the computer-readable media described herein. Mass storage device 508 may be used to store programs, data and the like and is typically a secondary storage medium such as a hard disk. It will be appreciated that the information retained within the mass storage device 508, may, in appropriate cases, be incorporated in standard fashion as part of primary storage 506 as virtual memory. A specific mass storage device such as a CD-ROM 514 may also pass data uni-directionally to the CPU.

CPU 502 is also coupled to an interface 510 that connects to one or more input/output devices such as such as video monitors or displays, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 502 optionally may be coupled to an external device such as a database or a computer or telecommunications network using an external connection as shown generally at 512. With such a connection, it is contemplated that the CPU might receive information from the network, or might output information to the network in the course of performing the method steps described herein. CPU 502 may also be coupled with any other suitable internal devices, such as a GPS device or NFC device 514 although these devices may be more applicable to client devices.

According to various embodiments, input may be obtained using a wide variety of techniques. For example, input for downloading or launching an application may be obtained via a graphical user interface from a user's interaction with a local application such as a mobile application on a mobile device, web site or web-based application or service and may be accomplished using any of a variety of well-known mechanisms for obtaining information from a user. However, it should be understood that such methods of obtaining input from a user are merely examples and that input may be obtained in many other ways.

A network may also include mass storage, such as network attached storage (NAS), a storage area network (SAN), or other forms of computer or machine readable storage media, for example. Regardless of the system's configuration (e.g., client or server), it may employ one or more memories or memory modules configured to store data, program instructions for the general-purpose processing operations and/or the inventive techniques described herein. The program instructions may control the operation of an operating system and/or one or more applications, for example. The memory or memories may also be configured to store instructions for performing the disclosed methods, graphical user interfaces to be displayed in association with the disclosed methods, etc.

Because such information and program instructions may be employed to implement the systems/methods described herein, the present invention relates to machine readable storage media that include program instructions, state information, etc. for performing various operations described herein. Examples of machine-readable storage media include, but are not limited to, magnetic media such as hard disks, floppy disks, and magnetic tape; optical media such as CD-ROM disks; magneto-optical media such as floptical disks; and hardware devices that are specially configured to store and perform program instructions, such as ROM and RAM. Examples of program instructions include both machine code, such as produced by a compiler, and files containing higher level code that may be executed by the computer using an interpreter.

Although the foregoing invention has been described in some detail for purposes of clarity of understanding, it will be apparent that certain changes and modifications may be practiced within the scope of the appended claims. Therefore, the present embodiments are to be considered as illustrative and not restrictive and the invention is not to be limited to the details given herein, but may be modified within the scope and equivalents of the appended claims.

What is claimed is:

1. A method for bidding on placement of advertisements within media content that is deliverable within a computer networking environment, the method comprising:
    at a communication interface of a bid determination platform, receiving a first bid request having data;
    determining a plurality of bids for a plurality of advertisements via a computer processor of the bid determination platform based on the data associated with such first bid request;
    determining that the first bid request's data includes one or more specific types of data for a bonus variable;
    increasing via the computer processor at least a first portion of the bids that were determined for the first bid request, wherein an amount of each of the first portion of the bids for the first bid request is increased by a bonus amount in response to the one or more specific types of data for a bonus variable being determined to be present in the first bid request's data; and
    for the first bid request, selecting an optimum set of one or more of the bids and transmitting the optimum bid, along with a reference to the associated advertisement, via the communication interface to a sender of the first bid request.

2. The method of claim 1, further comprising:
    receiving a second bid request having data;
    determining a plurality of second bids for a plurality of advertisements via a computer processor of the bid determination platform based on the data associated with such second bid request;
    determining that the second bid request's data is missing the one or more specific types of data for a bonus variable;
    maintaining at least a first portion of the second bids that were determined for the second bid request; and
    for the second bid request, selecting a second optimum set of one or more of the second bids and transmitting the second optimum bid, along with a reference to the associated advertisement, via the communication interface to a sender of the second bid request.

3. The method of claim 1, wherein one or more specific types of data that is included is user demographic specifications.

4. The method of claim 1, wherein increasing the first portion of the bids includes increasing each bid of the first portion by a predefined bonus amount that is predefined with respect to one or more bonus variables that are included in the bid request associated with the bid.

5. The method of claim 1, wherein increasing the first portion of the bids includes increasing different ones of the first portion bids by different bonus amounts for different advertisers or advertisements.

6. The method of claim 1, wherein increasing the first portion of the bids includes increasing different ones of the first portion bids by different bonus amounts for different publishers who send a corresponding plurality of bid requests for which the first portions bids are determined.

7. The method of claim 1, further comprising collecting statistical data for variances between bids that are determined for bid requests having varying amounts of variable data, wherein the first portion of bids are increased by a bonus amount that dynamically varies based on the collected statistical data.

8. The method of claim 1, wherein each bid is further based on an allocation amount for a particular campaign to receive of a predefined budget for a plurality of associated campaigns, wherein such allocation amount is based on a spend and performance level of the particular campaign relative to its associated campaigns and such allocation amount is adjusted by either a bonus amount in response to the one or more specific types of data being determined to be present in the first bid request's data or a penalty amount in response to one or more types of data being missing from the first bid request's data.

9. The method of claim 1, further comprising:
at a communication interface of a bid determination platform, receiving a second bid request having data;
determining a plurality of second bids for a plurality of advertisements via a computer processor of the bid determination platform based on the data associated with such second bid request;
determining that the second bid request's data is missing one or more second specific types of data for a bonus variable;
decreasing via the computer processor at least a first portion of the second bids that were determined for the second bid request, wherein an amount of each of the first portion of the second bids for the second bid request is decreased by a penalty amount in response to the one or more second specific types of data being determined to be missing from the second bid request's data; and
for the second bid request, selecting a second optimum set of one or more of the second bids and transmitting the second optimum bid, along with a reference to the associated advertisement, via the communication interface to a sender of the second bid request.

10. The method of claim 1, further comprising:
determining that the first bid request's data is missing one or more second specific types of data for a penalty variable; and
decreasing via the computer processor at least a second portion, which may also include at least a portion of the first portion, of the bids that were determined for the first bid request, wherein an amount of each of the second portion of the bids for the first bid request is decreased by a penalty amount in response to the one or more second specific types of data being determined to be missing from the first bid request's data.

11. A system for bidding on placement of advertisements within media content that is deliverable within a computer networking environment, the system comprising at least a processor and a memory, wherein the processor and/or memory are configured to perform the following operations:
receiving a first bid request having data;
determining a plurality of bids for a plurality of advertisements based on the data associated with such first bid request;
determining that the first bid request's data includes one or more specific types of data for a bonus variable;
increasing via the computer processor at least a first portion of the bids that were determined for the first bid request, wherein an amount of each of the first portion of the bids for the first bid request is increased by a bonus amount in response to the one or more specific types of data for a bonus variable being determined to be present in the first bid request's data; and
for the first bid request, selecting an optimum set of one or more of the bids and transmitting the optimum bid, along with a reference to the associated advertisement, to a sender of the first bid request.

12. The system of claim 11, wherein the processor and/or memory are configured for:
receiving a second bid request having data;
determining a plurality of second bids for a plurality of advertisements via a computer processor of the bid determination platform based on the data associated with such second bid request;
determining that the second bid request's data is missing the one or more specific types of data for a bonus variable;
maintaining at least a first portion of the second bids that were determined for the second bid request; and
for the second bid request, selecting a second optimum set of one or more of the second bids and transmitting the second optimum bid, along with a reference to the associated advertisement, via the communication interface to a sender of the second bid request.

13. The system of claim 11, wherein the one or more specific types of data that is included is user demographic specifications.

14. The system of claim 11, wherein increasing the first portion of the bids includes increasing each bid of the first portion by a predefined bonus amount that is predefined with respect to one or more bonus variables that are included in the bid request associated with the bid.

15. The system of claim 11, wherein increasing the first portion of the bids includes increasing different ones of the first portion bids by different bonus amounts for different advertisers or advertisements.

16. The system of claim 11, wherein increasing the first portion of the bids includes increasing different ones of the first portion bids by different bonus amounts for different publishers who send a corresponding plurality of bid requests for which the first portions bids are determined.

17. The system of claim 11, wherein the processor and/or memory are configured for collecting statistical data for variances between bids that are determined for bid requests having varying amounts of variable data, wherein the first portion of bids are increased by a bonus amount that dynamically varies based on the collected statistical data.

18. The system of claim 11, wherein each bid is further based on an allocation amount for a particular campaign to receive of a predefined budget for a plurality of associated campaigns, wherein such allocation amount is based on a spend and performance level of the particular campaign relative to its associated campaigns and such allocation amount is adjusted by either a bonus amount in response to the one or more specific types of data being determined to be present in the first bid request's data or a penalty amount in response to one or more types of data being missing from the first bid request's data.

19. At least one non-transitory computer readable storage medium having computer program instructions stored thereon that are arranged to perform the following operations:
- at a communication interface of a bid determination platform, receiving a first bid request having data;
- determining a plurality of bids for a plurality of advertisements via a computer processor of the bid determination platform based on the data associated with such first bid request;
- determining that the first bid request's data includes one or more specific types of data for a bonus variable;
- increasing via the computer processor at least a first portion of the bids that were determined for the first bid request, wherein an amount of each of the first portion of the bids for the first bid request is increased by a bonus amount in response to the one or more specific types of data for a bonus variable being determined to be present in the first bid request's data; and
- for the first bid request, selecting an optimum set of one or more of the bids and transmitting the optimum bid, along with a reference to the associated advertisement, via the communication interface to a sender of the first bid request.

20. The at least one non-transitory computer readable storage medium of claim 19, wherein the computer program instructions are further arranged for:
- receiving a second bid request having data;
- determining a plurality of second bids for a plurality of advertisements via a computer processor of the bid determination platform based on the data associated with such second bid request;
- determining that the second bid request's data is missing the one or more specific types of data for a bonus variable;
- maintaining at least a first portion of the second bids that were determined for the second bid request; and
- for the second bid request, selecting a second optimum set of one or more of the second bids and transmitting the second optimum bid, along with a reference to the associated advertisement, via the communication interface to a sender of the second bid request.

21. The at least one non-transitory computer readable storage medium of claim 19, wherein the one or more specific types of data that is included is user demographic specifications.

22. The at least one non-transitory computer readable storage medium of claim 19, wherein increasing the first portion of the bids includes increasing different ones of the first portion bids by different bonus amounts for different advertisers or advertisements.

23. The at least one non-transitory computer readable storage medium of claim 22, wherein the computer program instructions are further arranged for:
- at a communication interface of a bid determination platform, receiving a second bid request having data;
- determining a plurality of second bids for a plurality of advertisements via a computer processor of the bid determination platform based on the data associated with such second bid request;
- determining that the second bid request's data is missing one or more second specific types of data for a bonus variable;
- decreasing via the computer processor at least a first portion of the second bids that were determined for the second bid request, wherein an amount of each of the first portion of the second bids for the second bid request is decreased by a penalty amount in response to the one or more second specific types of data being determined to be missing from the second bid request's data; and
- for the second bid request, selecting a second optimum set of one or more of the second bids and transmitting the second optimum bid, along with a reference to the associated advertisement, via the communication interface to a sender of the second bid request.

24. The at least one non-transitory computer readable storage medium of claim 19, wherein the computer program instructions are further arranged for:
- collecting statistical data for variances between bids that are determined for bid requests having varying amounts of variable data, wherein the first portion of bids are increased by a bonus amount that dynamically varies based on the collected statistical data.

* * * * *